United States Patent Office 3,373,122
Patented Mar. 12, 1968

3,373,122
FOAMED POLYURETHANES
Maurice Richard Porter, Sully, Glamorgan, and Basil Longden, Barry, Glamorgan, Wales, assignors to Midland Silicones Limited, London, England
No Drawing. Filed Jan. 27, 1964, Ser. No. 340,537
Claims priority, application Great Britain, Jan. 29, 1963, 3,548/63
7 Claims. (Cl. 260—2.5)

This invention relates to a process for the production of improved foamed polyurethane resins and to polysiloxane - polyoxyalkylene copolymer and polysiloxane-polyalkyleneoxy copolymer compositions for use therein.

Foamed polyurethane resins have achieved considerable commercial importance. They are prepared by the reaction of a polyisocyanate with a compound containing at least two reactive hydrogen atoms and various techniques exist for carrying out this reaction, the technique employed depending mainly upon the nature of the reactants and the end product required. In one widely used method a polyhydric polyether is employed as the compound containing the reactive hydrogen atoms and this method has achieved popularity because of the relative cheapness of the polyethers. Initially it was found necessary to use a two stage or "prepolymer" technique in which the polyether is first reacted with the polyisocyanate to form a linear urethane polymer. In the second step the "prepolymer" is reacted with water, a catalyst and a surfactant to cause the mixture to foam. More recently one of the processing steps has been dispensed with. This modified, or "one-shot," process is carried out by mixing the essential ingredients in a single operation and allowing the mixture to foam. In order to prepare suitable foams by this technique it is known to include in the mixture a polysiloxane-polyoxyalkylene copolymer which is believed to function as the surfactant. Such polysiloxane-polyoxyalkylene copolymers comprise at least one polysiloxane portion attached to at least one polyoxyalkylene portion through a silicon-oxygen-carbon linkage. It has also been proposed to use as the surfactant the polysiloxane - polyalkyleneoxy copolymers which differ from the previously mentioned copolymers in that they contain a polysiloxane portion attached to a polyalkyleneoxy portion through a direct silicon-carbon linkage.

In view of the difficulties involved in preparing polysiloxane-polyoxyalkylene copolymers of consistent structure and also because of the hydrolytic instability of the —Si—O—C— linkage it has not always been possible to obtain foams having a predictable and consistent pore size when employing these copolymers. Storage of the copolymers containing the Si—O—C linkage prior to use has also presented problems as a result of their hydrolytic instability. There has therefore existed a need to improve the storage life of the polysiloxane-polyoxyalkylene copolymers and their performance in the preparation of polyurethane foams by the "one-shot" process.

We have now unexpectedly found that improved foams can be obtained if an aliphatic carboxylic acid or its anhydride as well as the polysiloxane-polyoxyalkylene copolymer or polysiloxane-polyalkyleneoxy copolymer is included in the mixture to be foamed. We have also found that the storage life of polysiloxane-polyoxyalkylene copolymers, that is those copolymers containing

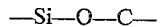

linkages can be improved by the addition thereto of an anhydride of an aliphatic carboxylic acid. Said aliphatic acids can themselves be conveniently premixed with the organosilicon copolymers.

The object of this invention is to improve polyurethane foam compositions. A storable polyurethane composition is sought. A further object is a polyurethane foam of consistent cell size. Other objects and advantages of this invention are detailed in or will be apparent from this disclosure.

The present invention provides a composition for use in the preparation of foamed polyurethanes which comprises a mixture of a polysiloxane - polyoxyalkylene or polysiloxane-polyalkyleneoxy copolymer and an aliphatic carboxylic acid or anhydride thereof.

This invention also provides a process for the preparation of improved foamed polyurethane materials which comprises reacting a polyhydric polyether, a polyisocyanate or polyisothiocyanate and a foaming agent in the presence of a polyurethane production catalyst and a composition of the invention, (or the separate constituents thereof), and thereafter allowing the mixture to foam.

As polyhydric polyethers there can be employed any of the wide variety of polyhydroxy compounds which are known to be suitable for the preparation of polyurethane foams by the "one-shot" technique. The polyethers can be linear or branched and contain at least two hydroxyl groups. Examples of polyethers which can be employed are the polyethylene and polypropylene glycols and particularly the poly(oxyalkylene) derivatives of polyhydric alcohols such as the poly(oxypropylene) and poly(oxyethylene) ethers of glycerol, trimethylolpropane, 1,2,6-hexanetriol, sorbitol and pentaerythritol. Preferred as polyethers are those poly(oxypropylene) polymers derived from the polyhydric alcohols and having a molecular weight of between about 2000 and 5000. Also suitable are the nitrogen-containing polyols such as the poly(oxyethylene)-poly(oxypropylene) block copolymers with ethylenediamine.

Suitable polyisocyanates and polyisothiocyanates have now become well known, commercially available commodities and include particularly the organic diisocyanates such as phenylene diisocyanates, toluene diisocyanates, xylylene diisocyanates, diphenylene diisocyanates and hexamethylene diisocyanate.

The polysiloxane-polyoxyalkylene copolymers for use in this invention can be those in which a polysiloxane portion is joined to a polyoxyalkylene portion through a silicon-oxygen-carbon linkage. Such copolymers can be prepared, for example, by the reaction of an alkoxylated siloxane with a polyalkylene glycol monoether. The structure of the copolymer produced by such a reaction will depend upon the quantity and type of the starting materials employed. For instance, it is possible to obtain a linear copolymer containing polysiloxane blocks and oxyalkylene blocks. Alternatively by the reaction between for example, a trichloro- or trialkoxy silane, a cyclic polysiloxane and a polyalkylene glycol monoether one can obtain a copolymer in which three valencies of the silicon atom of the alkoxy or chlorosilane are satisfied by copolymeric chains comprising siloxane blocks and oxyalkylene blocks. Further, if the process is carried out with tetrachloro or a tetraalkoxy-silane instead of the trichloro- or trialkoxy-silane there is obtained a copolymer in which the structure can be represented by a central silicon atom having its four valencies satisfied by copolymeric chains of blocks of siloxane and oxyalkylene units. Although theoretical structural formulae can be arrived at for the various polysiloxane-polyoxyalkylene copolymers it has been found that in practice the reaction product normally comprises a mixture of the desired copolymer with other copolymers of similar structure.

The compositions of the invention can also be formed from polysiloxane polyalkyleneoxy copolymers, that is, those copolymers in which the polysiloxane fragment is attached to a polyalkyleneoxy fragment through a silicon-carbon linkage. Such copolymers are best prepared by the reaction of a polysiloxane containing silicon-bonded hydrogen atoms with a polyglycol containing aliphatically unsaturated, e.g. allyl, radicals in the presence of a platinum or chloroplatinic acid catalyst. Like those copolymers containing —Si—O—C— linkages, these copolymers can be linear or branched and can for example be prepared by the reaction of a methyl hydrogen polysiloxane with a mono-allyl ether of a polyoxyalkylene glycol. Examples of siloxane-oxyalkylene copolymers of the type containing —Si—C— linkages are those described and claimed in U.S. Patents Nos. 2,846,458 and 2,868,824.

The foam-producing reaction is carried out in the presence of a polyurethane production catalyst. Many suitable catalyst materials are known but in general they are either organic amines or are organo-metal salts or organic metal compounds. Examples of catalysts are ethylenediamine, triethylenediamine, N-methyl morpholine, dibutyltin dilaurate and stannous octoate. It has been found advantageous in some instances to employ a mixture of catalysts such as, for example, a mixture of dibutyltin dilaurate and ethylenediamine.

The aliphatic carboxylic acids which can be employed in the process of the invention include monocarboxylic acids such as formic, acetic, propionic, valeric, lauric, myristic, palmitic, stearic and arachidic acids, unsaturated monocarboxylic acids, for example acrylic, methacrylic, crotonic and sorbic acids, di- and polycarboxylic acids, for example oxalic, malonic, succinic, adipic, pimelic, sebacic, maleic and fumaric acids and substituted carboxylic acids such as glycollic, tartaric, lactic, methoxyacetic, phenylacetic, chloroacetic and fluoroacetic acids. Also suitable are the anhydrides and mixed anhydrides of the aliphatic carboxylic acids, for example acetic anhydride, propionic anhydride and maleic anhydride. If desired, mixtures of the acids with themselves or with the anhydrides can be employed. Although some effect is obtained with the higher acids, the modification of cell-size in the foamed polyurethane apppears, at least in some cases, to be more marked when the lower acids are used. Preferably the acid or anhydride employed is one having less than about six carbon atoms in the molecule.

The amount of the acid or anhydride incorporated into the foam-making formulation is not critical. We have found it convenient to employ from about 0.1 to about 10% and preferably from about 0.5% to 5% by weight of the acid or anhydride based on the total weight present of the polysiloxane-polyoxyalkylene and polysiloxane-polyalkyleneoxy copolymers. Excessive amounts of the acid or anhydride are best avoided as in some cases this can lead to the appearance of splits in the foam structure.

The foamed polyurethanes can be prepared by any of the known techniques, such as by feeding the reaction components into a mixing head and ejecting them into a receptacle in which they are allowed to foam. Alternatively the reactants can be mixed in a suitable container and allowed to foam in situ or transferred to a mould. If desired the resulting foam can be subjected to a curing step by heating for several minutes at temperatures up to about 100–150° C. Normally the foaming agent employed will be water although some or all of the gas required for foam formation can be introduced into the reaction mixture from an external source, such as when trichlorofluoromethane is employed as the foaming agent.

Although the aliphatic carboxylic acid or anhydride can be simply mixed into the system in the same manner as the other ingredients it has been found convenient to premix this component with the organosilicon copolymer as this facilitates the mixing operation when preparing the polyurethane production reaction mixture. Further, and particularly when an acid anhydride is employed it performs the additional function of preserving the hydrolytic stability of the copolymer during storage prior to use, this being particularly beneficial in the case of those copolymers containing the —Si—O—C— linkage. In some cases such as when the acid is only dispersible with difficulty in the organosilicon copolymer it may be preferable to disperse the acid in one of the other components of the polyurethane reaction mixture. Normally however, and especially when the preferred lower unsubstituted acids are employed, dispersion of the acid in the copolymer can be readily carried out.

The use of an aliphatic carboxylic acid or anhydride as an ingredient in the "one-shot" process according to this invention leads to the production of foams having a finer cell size than those in which the acid, or the anhydride, is not present. This feature is often a desirable one and provides a means of modifying the physical properties of the foams. In addition, and more surprisingly, the use of such additives has made it possible for acceptable foamed materials to be obtained employing a wider range of formulations and stirrer speeds than has hitherto been possible.

The following examples illustrate the invention. The scope of the invention is delineated in the claims and is not limited by the examples.

*Example 1*

The siloxane-oxyalkylene copolymer employed in this experiment was produced by the reaction of silicon tetrachloride with octamethylcyclotetrasiloxane, thereafter reacting the chlorine end-stopped siloxane obtained with a polyoxyethylene-oxypropylene glycol mono-ether. The second stage of the reaction was carried out in solution in an organic solvent solution and in the presence of a halogen acid acceptor such as pyridine or ammonia. On completion of the reaction the base hydrochloride was filtered off and the solvent removed from the block copolymer product by filtration.

5% by weight of formic acid was then added to the organosilicon block copolymer obtained above and this solution was then added to an aqueous solution of triethylenediamine catalyst, the resulting mixture comprising

|  | Grams |
|---|---|
| Triethylenediamine | 0.2 |
| Water | 3.9 |
| Solution of formic acid in organosilicon copolymer | 1.0 |

This solution was then added to 100 g. of a commercial polyhydric polyether having a molecular weight of 3,000 and a hydroxyl number of 56 and of the general formula

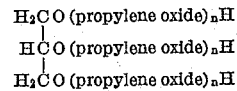

The addition was closely followed by the addition of 0.4 g. of stannous octoate. The mixture was stirred vigorously for 5 seconds after which time a mixture of 49 g. of toluene diisocyanate with 8 g. of trichlorofluoromethane was added, the stirring being continued for a further 12 seconds. At the end of this operation the mixture was poured into a paper mould and allowed to foam, the resulting foam being cured in an oven at 150° C. for approximately 10 minutes.

The foam obtained had small even cells. When the procedure was carried out with the formic acid omitted from the formulation the foam comprised cells of larger and less uniform size.

*Example 2*

The organosilicon copolymer employed in the present experiment was similar in type to that of Example 1 except that it was prepared by reacting tetraethyl orthosilicate with octamethyl cyclotetrasiloxane to obtain an alkoxy terminated polysiloxane which was then further reacted with polyoxyethylene-oxypropylene glycol monoether in the presence of a transesterification catalyst. Removal of the solvent employed during the reaction was then carried out by distillation to leave a mixture of polysiloxane-polyoxyalkylene block copolymers.

A solution was made up comprising 96 g. of the mixture of organosilicon copolymers and 4 g. of acetic anhydride and the solution was then stored in a closed container for one month. At the end of this period the solution was found to have remained clear. A sample of the mixture of copolymers which was stored under the same conditions and which contained no acetic anhydride was found to have turned cloudy, exhibiting the onset of hydrolysis. The solution of acetic anhydride in the block copolymer mixture was employed, after storage, in the preparation of polyurethane foam in the following formulation but according to the technique described in Example 1.

A solution comprising

| | Grams |
|---|---|
| Triethylenediamine | 0.2 |
| Water | 3.8 |
| Organosilicon copolymer/acetic anhydride solution | 0.75 | was added to 100 g. of a polyhydric polyether having a molecular weight of 3,000, followed by 0.4 g. stannous octoate and 0.1 ml. of N-methyl morpholine. To this mixture after stirring for 5 seconds was added 51 g. of toluene diisocyanate and after further stirring for 12 seconds the mixture was poured into a mould and allowed to foam. The resulting foam was then cured in an oven at 150° C. for 10 minutes. After curing the foam was cut open and was found to have an even, small cell structure.

A foam was also prepared according to the same formulation and employing the same organosilicon copolymer which had been stored under the same conditions but without the added acetic anhydride. This foam had a coarse uneven cell structure.

*Example 3*

A polysiloxane-polyoxyalkylene block copolymer was prepared by a technique similar to that used to produce the copolymer of Example 1 with the silicon tetrachloride replaced as the starting material by phenyl trichlorosilane.

95 g. of the copolymer so obtained was thoroughly mixed with 5 g. of acetic acid and the mixture used in the preparation of polyurethane foam according to the following formulation and by the technique employed in Examples 1 and 2.

A solution comprising

| | Grams |
|---|---|
| Triethylenediamine | 0.2 |
| Water | 2.9 |
| Acetic acid/organosilicon copolymer mixture | 0.5 | was added to 100 g. of a polyhydric polyether having a molecular weight of 3000 followed by 0.1 ml. of dibutyltin dilaurate and 44 g. of toluene diisocyanate the mixture being stirred thoroughly during the addition and the stirring being continued for 15 seconds after the addition was complete. The mixture was then poured into a mould and allowed to foam, the foam being cured by exposure to a temperature of 150° C. for about 10 minutes. When the cured foam was cut and examined it was found to exhibit a structure of small, even cells. A foam prepared by the same method but with the acetic acid omitted from the formulation had a structure composed of larger cells.

*Example 4*

A solution was made up comprising 3 g. of lactic acid and 97 g. of a commercial polysiloxane-polyoxyalkylene copolymer. This solution was then employed according to the following formulation to produce a polyurethane foam by the technique described in Examples 1 and 2.

The formulation comprised

| | Grams |
|---|---|
| Polyether (M.W.=3,000) | 100 |
| Water | 3.9 |
| Triethylene diamine | 0.2 |
| Lactic acid/organosilicon copolymer mixture | 1.0 |
| Stannous octoate | 0.4 |
| Toluene diisocyanate | 49.0 |
| Trichloromonofluoromethane | 8.0 |

When cured the foam obtained was found to have a small, even cell structure. A foam made from the formulation from which the lactic acid had been omitted exhibited a structure made up of larger cells.

*Example 5*

The organosilicon copolymer employed in this example comprised a dimethylpolysiloxone having per molecule an average of between five and nine alkyleneoxy blocks attached to silicon atoms in the siloxane chain through direct silicon-carbon linkages. Each of the alkyleneoxy blocks comprised approximately equal weights of oxyethylene units and oxypropylene units.

To 98.5 g. of this copolymer was added 1.5 g. of oleic acid which was dispersed by thorough stirring. A foamed polyurethane was then prepared employing 0.75 g. of this organosilicon copolymer/oleic acid solution in the formulation and by the technique described in Example 2. After being cured the foam obtained was found to have a structure comprised of mainly small cells. A foam prepared by the same technique but with the acid omitted from the formulation was found to be composed of very large cells.

*Example 6*

As the organosilicon copolymer there was employed in this example a dimethylpolysiloxane having per molecule an average of about three alkyleneoxy blocks attached to silicon atoms in the siloxane chain. Each of the alkyleneoxy blocks comprised approximately equal weights of oxyethylene and oxypropylene units.

The acid employed was oxalic acid. With this acid it was found more convenient firstly to dissolve the acid in the solution of triethylene diamine and water, the organosilicon copolymer then being added and stirred until it had also gone into solution. This solution contained 3% by weight of oxalic acid based on the weight of the copolymer and was employed according to the formulation and technique described in Example 2 to prepare a foam. The foam obtained had a structure of small pores of even size. A foam produced from the same formulation except that the acid was omitted had a structure comprised mainly of large pores of varying sizes.

*Example 7*

Similar results were obtained when the procedure of Example 6 was repeated employing in turn sorbic acid and trifluoroacetic acid in place of the oxalic acid used in that example.

That which is claimed is:

1. A composition for use in the production of foamed polyurethanes based on reaction products of a polyhydric polyether and a compound selected from the group consisting of polyisocyanates and polyisothiocyanates consisting essentially of a mixture of (a) copolymer selected from the group consisting of polysiloxane-polyoxyalkylene copolymers and polysiloxane-polyalkyleneoxy copolymers and (b) 0.1 to 10.0% by weight based on the weight of copolymer (a) of an additive which is an anhydride of an aliphatic carboxylic acid and contains from 1–20 carbon atoms.

2. A composition as claimed in claim 1 wherein the anhydride (b) contains less than six carbon atoms.

3. A composition as claimed in claim 1 wherein the anhydride (b) is present in an amount of from 0.5 to 5.0 percent by weight of the copolymer.

4. A composition as claimed in claim 1 wherein the copolymer is one in which a polysiloxane fragment is attached to a polyoxyalkylene fragment through a silicon-oxygen-carbon linkage.

5. A composition as claimed in claim 1 wherein the copolymer comprises both ethylene oxide and propylene oxide units.

6. A process for the preparation of foamed polyurethanes which comprises reacting a polyhydric polyether, a compound selected from the group consisting of polyisocyanates and polyisothiocyanates, copolymer selected from the group consisting of polysiloxane-polyoxyalkylene copolymers and polysiloxane-polyalkyleneoxy copolymers and a foaming agent in the presence of a catalyst and 0.1 to 10.0% by weight based on the weight of copolymer (a) of an additive selected from the group consisting of aliphatic carboxylic acids and anhydrides thereof, and thereafter allowing the mixture to foam.

7. A process as claimed in claim 6 wherein the additive is present in an amount of from 0.5 to 5.0 percent by weight based on the weight of the copolymer.

References Cited

UNITED STATES PATENTS

| 2,955,091 | 10/1960 | Kane | 260—2.5 |
|---|---|---|---|
| 3,178,300 | 4/1965 | Gemeinhardt et al. | 106—122 |
| 2,834,748 | 5/1958 | Bailey et al. | 260—825 |
| 2,846,458 | 8/1958 | Haluska | 260—448.2 |
| 2,868,824 | 1/1959 | Haluska | 260—448.2 |
| 3,067,149 | 12/1962 | Dombrow et al. | 260—2.5 |
| 3,194,773 | 7/1965 | Hostettler | 260—2.5 |
| 3,201,359 | 8/1965 | Herrick et al. | 260—2.5 |
| 3,211,674 | 10/1965 | Sandridge | 260—2.5 |

FOREIGN PATENTS 744,027  1/1956  Great Britain.

DONALD E. CZAJA, *Primary Examiner.*

LEON J. BERCOVITZ, *Examiner.*

F. McKELVEY, *Assistant Examiner.*